United States Patent
Zhang et al.

(10) Patent No.: US 11,790,046 B2
(45) Date of Patent: Oct. 17, 2023

(54) DEVICE AND METHOD FOR CLASSIFICATION USING CLASSIFICATION MODEL AND COMPUTER READABLE STORAGE MEDIUM

(71) Applicant: FUJITSU LIMITED, Kawasaki (JP)

(72) Inventors: Meng Zhang, Beijing (CN); Rujie Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 241 days.

(21) Appl. No.: 17/460,316

(22) Filed: Aug. 30, 2021

(65) Prior Publication Data
US 2022/0101040 A1  Mar. 31, 2022

(30) Foreign Application Priority Data
Sep. 30, 2020 (CN) .................. 202011061801.0

(51) Int. Cl.
*G06F 18/2413* (2023.01)
*G06V 40/16* (2022.01)
*G06F 18/214* (2023.01)

(52) U.S. Cl.
CPC ........ *G06F 18/2413* (2023.01); *G06F 18/214* (2023.01); *G06V 40/168* (2022.01); *G06V 40/172* (2022.01)

(58) Field of Classification Search
CPC .... G06V 40/168; G06V 40/193; G06V 40/72; G06V 40/1365; G06V 40/197; G06V 20/46; G06V 20/41; G06V 10/44; G06V 10/806; G06V 10/764; G06V 10/82; G06F 18/253; G06F 18/24; G06F 18/241; G06F 18/2413; G06F 18/214
See application file for complete search history.

(56) References Cited

FOREIGN PATENT DOCUMENTS

JP    2020077329 A  *  5/2020

OTHER PUBLICATIONS

KUBO (translation of JP-2020077329-A) (Year: 2020).*
Hao, Pingchang, and Liyong Zhang. "Image Classification Using Convolutional Neural Network Based on Feature Selection for Edge Computing." In 2021 40th Chinese Control Conference (CCC), pp. 8520-8526. IEEE, 2021. (Year: 2021).*
Deng et al., "ArcFace: Additive Angular Margin Loss for Deep Face Recognition", CVPR Paper, Computer Vision Foundation, IEEE Xplore, 2019, pp. 4690-4699.

* cited by examiner

*Primary Examiner* — Bobbak Safaipour
*Assistant Examiner* — Wassim Mahrouka
(74) *Attorney, Agent, or Firm* — XSENSUS LLP

(57) ABSTRACT

A device and a method for classification using a pre-trained classification model and a computer readable storage medium are provided. The device is configured to extract, for each of multiple images in a target image group to be classified, a feature of the image using a feature extraction layer of the pre-trained classification model; calculate, for each of the multiple images, a contribution of the image to a classification result of the target image group using a contribution calculation layer of the pre-trained classification model; aggregate extracted features of the multiple images based on calculated contributions of the multiple images, to obtain an aggregated feature as a feature of the target image group; and classify the target image group based on the feature of the target image group.

17 Claims, 7 Drawing Sheets

1:1 authentication in case of using IJB-C dataset of NIST

| TAR@FAR | 0.001% | 0.01% | 0.1% |
|---|---|---|---|
| ArcFace | 87.28 | 92.13 | 95.55 |
| CAN | 94.15 | 96.08 | 97.23 |

Figure 4A

1:N recognition in case of using COX facial dataset

| Model | V2S_1 | V2S_2 | V2S_3 |
|---|---|---|---|
| VGG Face | 88.36±1.02 | 80.46±0.76 | 90.93±1.02 |
| TBE-CNN | 93.57±0.65 | 93.69±0.51 | 98.96±0.17 |
| CAN | 98.63±0.17 | 97.81±0.36 | 99.63±0.15 |

Figure 4B

DEVICE AND METHOD FOR CLASSIFICATION USING CLASSIFICATION MODEL AND COMPUTER READABLE STORAGE MEDIUM

CROSS-REFERENCE TO RELATED APPLICATION

This application claims the priority benefit of Chinese Patent Application No. 202011061801.0, filed on Sep. 30, 2020 in the China National Intellectual Property Administration, the disclosure of which is incorporated herein in its entirety by reference.

FIELD

The present disclosure relates to the field of information processing, and in particular to a device and a method for classification using a classification model and a computer readable storage medium.

BACKGROUND

Object classification (for example, facial recognition) based on an image group such as a video is widely applied in fields of video surveillance and security authentication, so that the object classification has received a lot of attention in academia and industry. Different from object classification based on a still image, in the object classification based on an image group such as a video, image quality of the video is poor, for example, the object changes greatly in attitude and is easily covered, which may result in poor classification performance.

SUMMARY

In the following, an overview of the present disclosure is given simply to provide basic understanding to some aspects of the present disclosure. It should be understood that this overview is not an exhaustive overview of the present disclosure. It is neither intended to determine a critical part or an important part of the present disclosure, nor to limit the scope of the present disclosure. An object of the overview is only to give some concepts of the present disclosure in a simplified manner, which serves as a preface of a more detailed description described later.

In view of the above problems, an object of the present disclosure is to provide a device and a method for training a classification model, as well as a device and a method for classification using the classification model to solve one or more problems in the conventional technology.

According to an aspect of the present disclosure, a device for classification using a pre-trained classification model is provided. The device includes a feature extraction unit, a contribution calculation unit, a feature aggregation unit, and a classification unit. The feature extraction unit is configured to extract, for each of multiple images in a target image group to be classified, a feature of the image using a feature extraction layer of the pre-trained classification model. The contribution calculation unit is configured to calculate, for each of the multiple images, a contribution of the image to a classification result of the target image group using a contribution calculation layer of the pre-trained classification model. The feature aggregation unit is configured to aggregate features of the multiple images extracted by the feature extraction unit based on contributions of the multiple images calculated by the contribution calculation unit, to obtain an aggregated feature as a feature of the target image group. The classification unit is configured to classify the target image group based on the feature of the target image group.

According to another aspect of the present disclosure, a method for classification using a pre-trained classification model is provided. The method includes a feature extraction step, a contribution calculation step, a feature aggregation step, and a classification step. The feature extraction step includes: extracting, for each of multiple images in a target image group to be classified, a feature of the image using a feature extraction layer of the pre-trained classification model. The contribution calculation step includes: calculating, for each of multiple images, a contribution of the image to a classification result of the target image group using a contribution calculation layer of the pre-trained classification model. The feature aggregation step includes aggregating features of the multiple images extracted in the feature extraction step based on contributions of multiple images calculated in the contribution calculation step, to obtain an aggregated feature as a feature of the target image group. The classification step includes classifying the target image group based on the feature of the target image group.

Computer program codes and a computer program product for implementing the method according to the present disclosure, and a computer readable storage medium having the computer program codes for implementing the method according to the present disclosure recorded thereon are further provided according to other aspects of the present disclosure.

Other aspects of embodiments of the present disclosure are given in the following specification, in which a detailed description is used to fully disclose preferred embodiments among the embodiments of the present disclosure without limitations on them.

BRIEF DESCRIPTION OF THE DRAWINGS

The present disclosure may be better understood by referring to the detailed descriptions given below in conjunction with the drawings. Same or similar reference numerals are used to represent the same or similar components in the drawings. The drawings, together with the following detailed descriptions, are included in the specification and form a part of the specification, to further exemplify preferred embodiments of the present disclosure and to explain principles and advantages of the present disclosure. In the drawings:

FIGS. 4A and 4B are schematic diagrams showing comparison between a classification accuracy of the device for classification using a pre-trained classification model according to an embodiment of the present disclosure and a classification accuracy of a device in the conventional technology;

DETAILED DESCRIPTION OF EMBODIMENTS

Figure 1:
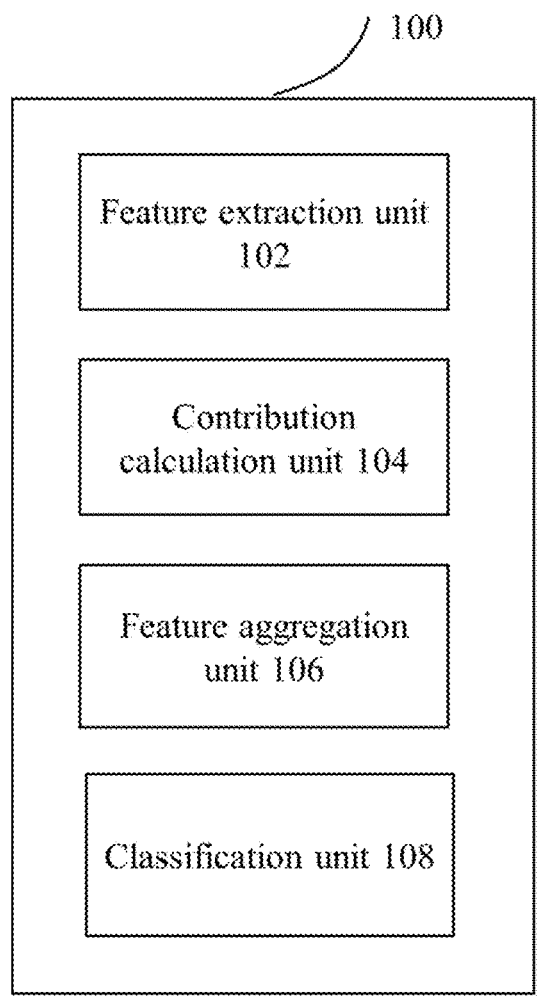
FIG. 1 is a block diagram of a functional configuration example of a device for classification using a pre-trained classification model according to an embodiment of the present disclosure.

Exemplary embodiments of the present disclosure are described below in conjunction with the drawings. For conciseness and clarity, not all features of an actual embodiment are described in this specification. However, it should be understood that numerous embodiment-specific decisions, for example, complying with constraining conditions related to system and business, should be made when developing any of such actual embodiments, so as to achieve a specific target of a developer. These constraining conditions may vary from one implementation to another. Furthermore, it should be understood that although development work may be complicated and time-consuming, for those skilled in the art benefiting from the present disclosure, such development work is only a routine task.

Here, it should further be noted that in order to avoid obscuring the present disclosure due to unnecessary details, only a device structure and/or processing step closely related to the solutions according to the present disclosure are illustrated in the drawings, and other details less related to the present disclosure are omitted.

The embodiments of the present disclosure are described in detail below in conjunction with the drawings.

Figure 2:
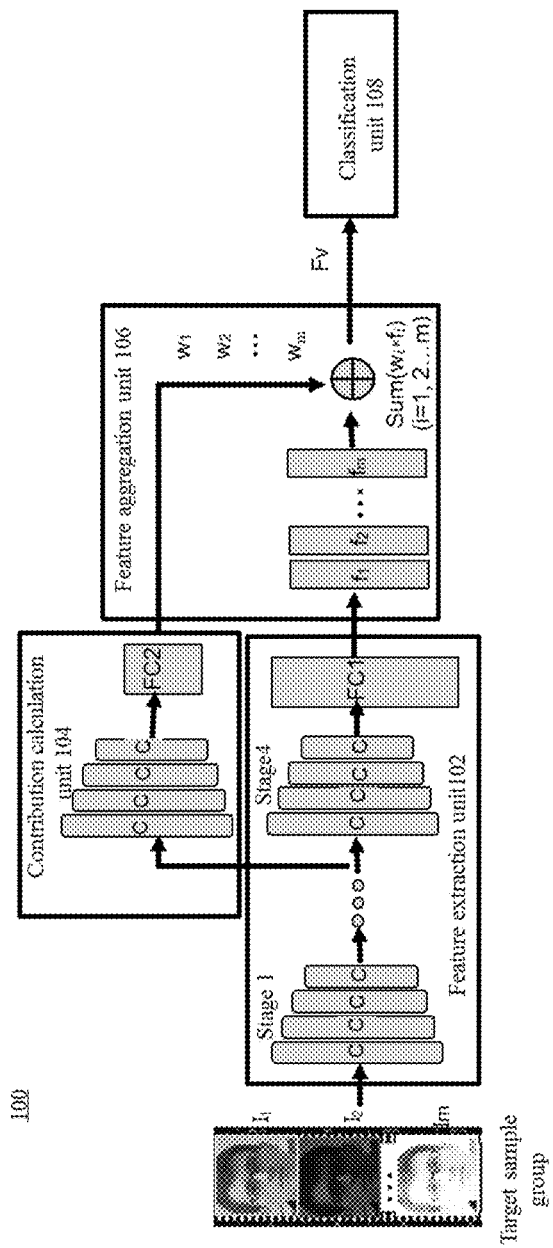
FIG. 2 is a block diagram of an architecture example of implementation of the device for classification using a pre-trained classification model according to an embodiment of the present disclosure.

An implementation example of a device for classification using a pre-trained classification model according to an embodiment of the present disclosure is described first with reference to FIGS. 1 and 2. FIG. 1 is a block diagram of a functional configuration example of a device 100 for classification using a pre-trained classification model according to an embodiment of the present disclosure. FIG. 2 is a block diagram of an architecture example of implementation of the device 100 for classification using a pre-trained classification model according to an embodiment of the present disclosure.

As shown in FIG. 1 and FIG. 2, the device 100 for classification using a pre-trained classification model according to an embodiment of the present disclosure may include a feature extraction unit 102, a contribution calculation unit 104, a feature aggregation unit 106 and a classification unit 108.

The feature extraction unit 102 may be configured to extract, for each of multiple images in a target image group to be classified, a feature of the image using a feature extraction layer of the pre-trained classification model. For example, the target image group may correspond to a video clip. In this case, the target image group may include all frames or a part of frames of the video clip. In addition, for example, images included in one target image group may relate to the same object. However, one target image group may also include multiple images that relate to two or more objects.

In addition, for example, as shown in FIG. 2, the target image group may be comprised of facial images. For example, the target image group may include all frames or a part of frames of a video clip that includes a face. However, the target image group is not limited to the above case, and the target image group may include another image, which is not repeated herein.

The pre-trained classification model may be any applicable pre-trained classification model. For example, the pre-trained classification model may be a pre-trained deep learning network model such as a pre-trained convolution neural network model.

FIG. 2 shows an architecture example of implementation of the device 100 according to an embodiment of the present disclosure in a case that a pre-trained convolution neural network model serves as the pre-trained classification model. As shown in FIG. 2, a feature extraction layer of the pre-trained classification model may include one or more convolution layers C and a fully connected layer FC1 of the convolution neural network model. It should be noted that the feature extraction layer of the pre-trained classification model is not limited to the example shown in FIG. 2, and those skilled in the field may set the feature extraction layer according to actual needs, which is not repeated herein.

The contribution calculation unit 104 may be configured to calculate, for each of the multiple images, a contribution of the image to a classification result of the target image group using a contribution calculation layer of the pre-trained classification model. For example, the contribution may indicate a degree of influence such as a degree of positive influence of the image on the classification result of the target image group. For example, for an image, a great degree of positive influence of the image on the classification result of the target image group or a great possibility that the image causes the target image group to be correctly classified corresponds to a great contribution of the image.

As shown in FIG. 2, in a case that the pre-trained convolution neural network model serves as the pre-trained classification model, the contribution calculation layer may include one or more convolution layers C and a fully connected layer FC2 of the convolution neural network model. It should be noted that the contribution calculation layer of the pre-trained classification model is not limited to the example shown in FIG. 2. For example, the contribution calculation layer may include only one fully connected layer FC2. In addition, those skilled in the art may set the contribution calculation layer according to actual needs, which is not repeated herein.

In addition, it should be noted that although FIG. 2 shows that the contribution calculation unit 104 calculates the contribution of an image based on a feature of the image at a stage of feature extraction, in practical applications, the contribution calculation unit 104 may calculate the contributions of the images in the target image group directly based on the images.

In addition, as appreciated by those skilled in the art, structural parameters of different convolution layers and fully connected layers shown in FIG. 2 may be different.

The feature aggregation unit 106 may be configured to aggregate features of the multiple images extracted by the feature extraction unit 102 based on contributions of the multiple images calculated by the contribution calculation unit 104, to obtain an aggregated feature as a feature of the target image group.

The classification unit 108 may be configured to classify the target image group based on the feature of the target image group. For example, the classification unit 108 may identify the target image group based on the feature of the target image group.

According to the embodiments of the present disclosure, the feature aggregation unit 106 may be further configured to calculate a weighted average of the features of the multiple images in the target image group extracted by the feature extraction unit 102 based on the contributions of the multiple images calculated by the contribution calculation unit 104, as the feature of the target image group. For example, in a case that the target image group corresponds to a video clip, the feature of the target image group may be referred to as a "video level feature".

For example, the feature aggregation unit 106 may obtain the feature Fv of the target image group based on the following equation (1).

$$F_V = \phi(f_1, f_2, \ldots f_m) = \frac{\sum_{i=1}^{m} w_i * f_i}{\sum_{i=1}^{m} w_i} \quad \text{equation (1)}$$

In the equation (1), $f_1$, $f_2$ and $f_m$ respectively represent features of a first image $I_1$, a second image $I_2$ and an (m)th image $I_m$ in the target image group extracted by the feature extraction unit 102, and $w_i$ represents contribution of an (i)th image in the target image group calculated by the contribution calculation unit 104.

For example, according to the embodiments of the present disclosure, the feature aggregation unit 106 may be further configured to aggregate, based on contributions of one or more images whose contributions are greater than or equal to a predetermined threshold among the multiple images in the target image group, features of the one or more images, to obtain an aggregated feature as the feature of the target image group. For example, the feature aggregation unit 106 may calculate a weighted average of the features of the one or more images whose contributions are greater than or equal to the predetermined threshold among the multiple images in the target image group, based on the contributions of the one or more images, as the feature of the target image group.

It should be noted that although in the example described above, the feature aggregation unit 106 aggregates features of all or part of the sample images included in the target image group to obtain the feature of the target image group, a manner in which the feature of the target image group is obtained is not limited to the above example, and those skilled in the art may obtain the feature of the target image group in a proper manner according to actual needs. For example, a feature of an image whose contribution is the greatest in the target image group may be determined as the feature of the target image group.

As described above, the device 100 for classification using a pre-trained classification model according to an embodiment of the present disclosure calculates contributions of the images included in the target image group, and aggregates the features of the images included in the target image group based on the calculated contributions, thereby classifying the target image group based on the aggregated features. Compared with the conventional technology in which the target image group is classified based on an average of features of the images included in the target image group, the device 100 according to an embodiment of the present disclosure classifies the target image group based on features of one or more images in the target image group with consideration of contributions of respective images in the target image group to the classification result, so that classification accuracy can be improved.

Experimental analysis shows that a contribution of an image may be related to quality of the image. High quality of the image leads to a great contribution of the image. However, it should be noted that a contribution of an image is not equivalent to quality of the image. For example, as described above, a contribution of an image may indicate a degree of influence of the image on the classification result of the target image group, for example, the degree of positive influence.

According to an embodiment of the present disclosure, for each of the multiple images included in the target image group, a contribution of the image to the classification result of the target image group may be represented by a scalar. For example, a contribution of each image may be represented by a number greater than zero. For example, a contribution of each image may be represented by a number within a predetermined range (for example, a range from 0 to 20). The predetermined range may be determined based on experiences or experiments.

Alternatively, according to an embodiment of the present disclosure, for each of the multiple images included in the target image group, a contribution of the image to the classification result of the target image group includes a contribution of a feature of the image in each dimension to the classification result of the target image group. For example, in a case that an image includes a feature in N dimensions (for example, 512 dimensions), a contribution of the image may be represented by an N-dimensional contribution vector. Elements in the N-dimensional contribution vector respectively represent contributions of the N dimensions of the feature of the image to the classification result. For example, through calculating a contribution for each dimension of the feature of the image, the classification accuracy can be further improved.

According to an embodiment of the present disclosure, the pre-trained classification model may be obtained from an initial classification model by: extracting, for each sample image in at least one sample image group included in a training sample set, a feature of the sample image using a feature extraction layer of the initial classification model; for each of the at least one sample image group: calculating, for each sample image in the sample image group, a contribution of the sample image to a classification result of the sample image group using a contribution calculation layer of the initial classification model, and aggregating features of sample images in the sample image group based on contributions of the sample images in the sample image group, to obtain an aggregated feature as a feature of the sample image group; and training, using the feature of each of the at least one sample image group, the initial classification model based on a loss function for the initial classification model to meet a predetermined convergence condition.

For example, the predetermined convergence condition may be one of: the number of training reaches a predetermined number; the loss function is minimized; and the loss function is less than or equal to a predetermined threshold.

As an example, the initial classification model may be established based on any appropriate untrained classification model. Alternatively, for example, the initial classification model may be established based on any appropriate existing trained classification model (such as a VGGnet model, a Resnet model and the like). For example, a branch may be added to the existing trained classification model as a contribution calculation layer. The training can be simplified by establishing the initial classification model based on the existing trained classification model. As an example, a parameter of the feature extraction layer of the initial classification model is fixed when training the initial classification model, which may further simplify the training. However, the parameter of the feature extraction layer of the initial classification model may not be fixed when training the initial classification model.

According to an embodiment of the present disclosure, the loss function may include a classification loss function used for characterizing a classification loss of the initial classification model. For example, a loss function similar to Softmax function may serve as the classification loss function. For example, the classification loss function $L_{id}$ may be expressed as the following equation (2).

$$L_{id} = -\frac{1}{N}\sum_{i=1}^{N}\log\frac{e^{s(\cos(\theta_{yi}+m))}}{e^{s(\cos(\theta_{yi}+m))} + \sum_{j=1,j\neq y}^{N}e^{s(\cos\theta_j)}} \quad \text{equation (2)}$$

In the above equation (2), N represents the number of sample image groups in a mini-batch, θ represents an angle between a feature of a sample image group and a weight corresponding to the sample image group, s and m represent a scaling factor and an edge factor respectively. Definitions of parameters in the above equation (2) are basically the same as those in reference 1 (ArcFace: Additive Angular Margin Loss for Deep Face Recognition) except for the definition of θ. In the reference 1, θ represents an angle between a feature of a sample image and a weight corresponding to the sample image. As mentioned above, in the above equation (2), θ represents an angle between the feature of the sample image group (for example, a video level feature) and a weight corresponding to the sample image group.

As described above, the initial classification model is trained by using the classification loss function and a true value of a contribution or quality of a training data set (that is, the sample image group) is not required, so that cost of preparing the training data set can be greatly reduced.

Alternatively, according to an embodiment of the present disclosure, the loss function may include the classification loss function and a contribution loss function. The contribution loss function may be used for characterizing a distance between a feature of each of the at least one sample image group and a center of a feature of a class into which the sample image group is classified. For example, the loss function L may be expressed as the following equation (3).

$$L = L_{id} + \lambda L_c \quad \text{equation (3)}$$

In the above equation (3), λ represents a tradeoff factor and is greater than or equal to zero. A great λ represents a great proportion of the contribution loss function $L_c$ in the training. For example, the contribution loss function may be represented as the following expression (4).

$$L_c = \sum_{i=0}^{N}\|F_{v_i} - F_{c_{yi}}\| = \sum_{i=0}^{N}\left\|\frac{\sum_{j=0}^{m}c_j * f_j}{\sum_{j=0}^{m}c_j} - F_{c_{yi}}\right\| \quad \text{equation (4)}$$

In the above equation (4), $F_c$ represents a feature of an (i)th sample image group, $F_{c_n}$ represents a center of a feature of a class $y_i$ into which the (i)th sample image group is classified for a training sample set or a training sample subset. $F_{c_n}$ may be updated in real time during training. For example, in the case that $F_{c_n}$ represents a center of a feature of the class $y_i$ for the training sample set, $F_{c_n}$ may be obtained by calculating an average of features (for example, video level features) of one or more sample image groups classified as the class $y_i$ among sample image groups that have been used during training in the training sample set. In addition, for example, in the case that $F_{c_n}$ represents a center of a feature of the class $y_i$ for a training sample subset, $F_{c_n}$ may be obtained by calculating an average of features (for example, video level features) of one or more sample image groups classified as the class $y_i$ among sample image groups that have been used during training in the training sample subset.

In the conventional technology, in a process of training a classification model, in view of problems such as processing capacity of a training device, training is usually performed by a mini-batch, and thus global information is ignored. By introducing the contribution loss function in training as described above, the classification model is trained taking into account of global information obtained from the training sample set or the training sample subset, which improves accuracy of the trained classification model obtained thereby, for example.

Figure 3A:
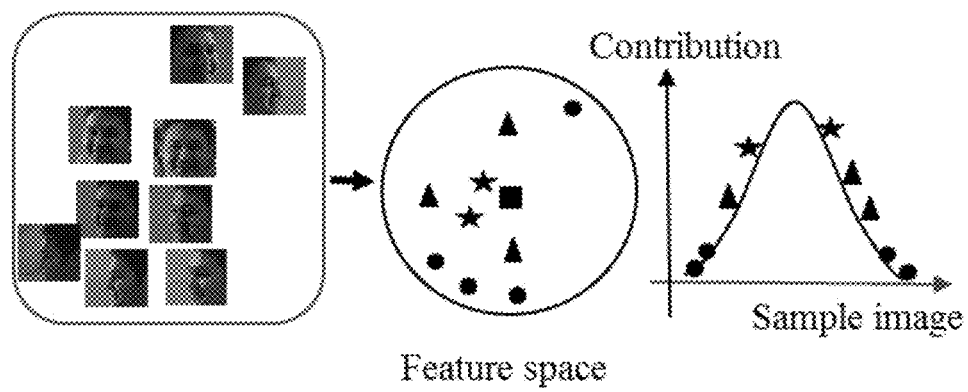
FIGS. 3A, 3B and 3C are schematic diagrams showing beneficial effects caused by an exemplary contribution loss function according to an embodiment of the present disclosure.
Figure 3B:
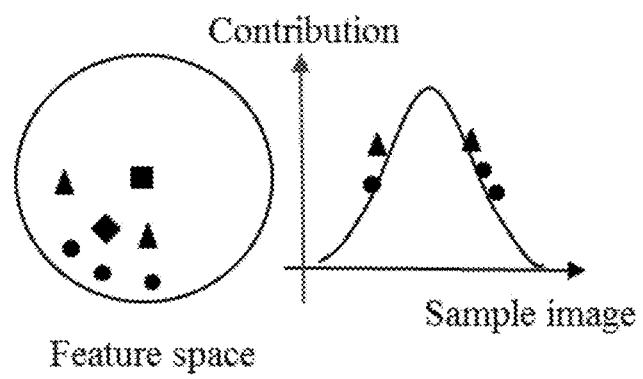
Figure 3C:
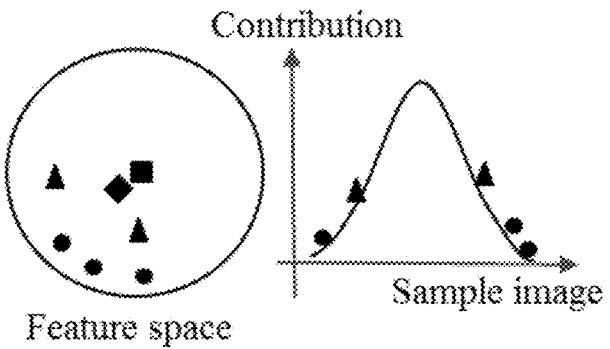

In order to illustrate beneficial effects of introducing the contribution loss function, the beneficial effects are illustrated hereafter with reference to FIGS. 3A to 3C and in conjunction with an example of video-based face recognition.

FIG. 3A is a schematic diagram showing a training sample subset for a certain class T (that is, a certain person) and an actual feature distribution and contribution distribution of sample images in the training sample subset. FIG. 3B and FIG. 3C are schematic diagrams showing a feature distribution and contribution distribution for multiple sample images (that is, multiple sample images included in one mini-batch) used in one training process in the above training sample subset, in a case in which the contribution loss function is not introduced and in a case in which the contribution loss function is introduced, respectively.

In FIG. 3A to FIG. 3C, "●", "▲" and "★" represent sample images. An actual contribution of a sample image represented by "●" is relatively low, and an actual contribution of a sample image represented by "★" is relatively high. In addition, "■" represents a center of an actual feature distribution of the class T, and "♦" represents a center of a feature distribution of the class T calculated in one training process. Moreover, since an sample image represented by "★" is not used in a training process corresponding to FIGS. 3B and 3C, "★" is not shown in FIGS. 3B and 3C. As can be seen from FIGS. 3A to 3C, as compared with the case in which the contribution loss function is not introduced, in the case in which the contribution loss function is introduced, the center of the feature distribution of the class T calculated in one training process is closer to the center of the actual feature distribution of the class T, and a contribution of each sample image calculated in one training process is closer to an actual contribution of the sample image. Therefore, the contribution of each sample image can be calculated accurately by introducing the contribution loss function, thereby improving the classification accuracy of the pre-trained classification model obtained thereby, for example.

The beneficial effect of the device 100 for classification using a pre-trained classification model according to the embodiment of the present disclosure in classification accuracy is illustrated thereafter with reference to FIGS. 4A and 4B and in conjunction with an example of video-based face recognition. In FIGS. 4A and 4B, the pre-trained classification model used by the device 100 according to the embodiment of the present disclosure is based on the ResNet50, and the pre-trained classification model is represented as "CAN".

FIG. 4A shows comparison between a classification accuracy of the device 100 according to the embodiment of the present disclosure and a classification accuracy of an ArcFace-based device in a case of using an IJB-C data set of NIST. As can be seen from FIG. 4A, in a case of FAR (False Accept Rate)=0.001%, compared with the ArcFace-based device, TAR (Ture Accept Rate) of the device 100 according to the embodiment of the present disclosure improves by about 7%.

FIG. 4B shows comparison among a classification accuracy of the device 100 according to the embodiment of the present disclosure, a classification accuracy of a VGG Face-based device and a classification accuracy of a TBE-CNN-based device in a case of using a COX facial data set. In FIG. 4B, V2S_1, V2S_2 and V2S_3 represent video face to still face recognition in cases of capturing video using different imaging devices, respectively. As can be seen from FIG. 4B, in a case of V2S_1, a recognition rate of the device 100 according to the embodiment of the present disclosure is increased by about 10% compared with that of the VGG Face-based device and increased by about 5% compared with that of the TBE-CNN-based device.

The device for classification using a pre-trained classification model according to the embodiments of the present disclosure has been described above. Corresponding to the above device embodiment, the following embodiments of a method for classification using a pre-trained classification model are further provided.

Figure 5:
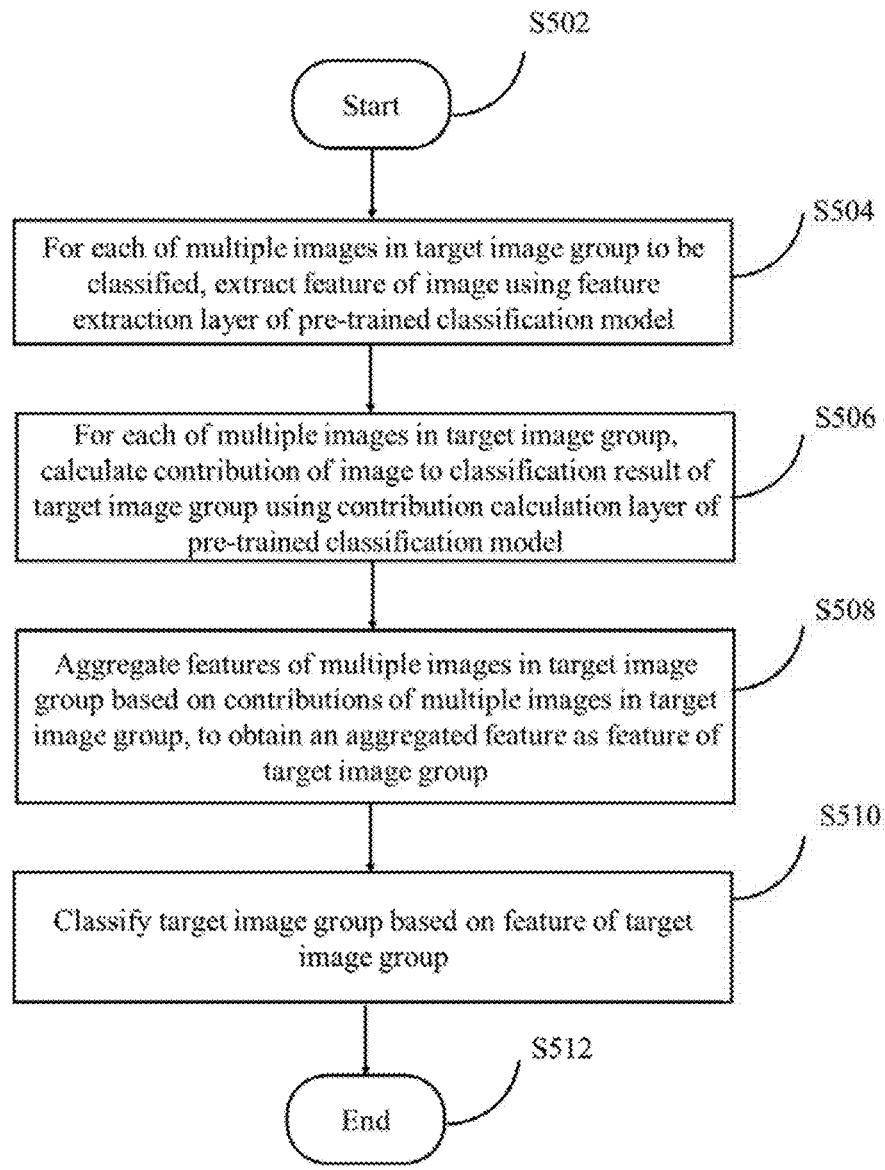
FIG. 5 is a flowchart of an exemplary flow of a method for classification using a pre-trained classification model according to an embodiment of the present disclosure.

FIG. 5 is a flowchart of an exemplary flow of a method 500 for classification using a pre-trained classification model according to an embodiment of the present disclosure. As shown in FIG. 5, the method 500 for classification using a pre-trained classification model according to the embodiment of the present disclosure may start with a start step S502 and end with an end step S512. The method 500 according to the embodiment of the present disclosure may include a feature extraction step S504, a contribution calculation step S506, a feature aggregation step S508 and a classification step S510.

In the feature extraction step S504, for each of multiple images in a target image group to be classified, a feature of the image may be extracted using a feature extraction layer of the pre-trained classification model. For example, the target image group may correspond to a video clip. In this case, the target image group may include all frames or a part of frames of the video clip. For example, the feature extraction step S504 may be performed by the feature extraction unit 102 described above, and details thereof are not repeated herein.

In the contribution calculation step S506, for each of the multiple images, a contribution of the image to a classification result of the target image group may be calculated using a contribution calculation layer of the pre-trained classification model. For example, the contribution may indicate a degree of influence such as a degree of positive influence of the image on the classification result of the target image group. For example, for an image, a great degree of positive influence of the image on the classification result of the target image group corresponds to a great contribution of the image. For example, the contribution calculation step S506 may be performed by the contribution calculation unit 104 described above, and details thereof are not described herein.

In the feature aggregation step S508, features of the multiple images in the target image group extracted in the feature extraction step S504 may be aggregated based on contributions of the multiple images in the target image group calculated in the contribution calculation step S506, to obtain an aggregated feature as a feature of the target image group. For example, the feature aggregation step S508 may be performed by the feature aggregation unit 106 described above, and details thereof are not described herein.

In the classification step S510, the target image group may be classified based on the feature of the target image group. For example, in the classification step S510, the target image group may be recognized based on the feature of the target image group. In addition, for example, the classification step S510 may be performed by the classification unit 108 described above, and details thereof are not described herein.

According to an embodiment of the present disclosure, in the feature aggregation step S508, a weighted average of the features of the multiple images extracted in the feature extraction step S504 may be calculated based on the contributions of the multiple images calculated in the contribution calculation step S506, as the feature of the target image group. For example, in the feature aggregation step S508, the feature Fv of the target image group may be obtained according to the above equation (1).

Alternatively, according to an embodiment of the present disclosure, in the feature aggregation step S508, features of one or more images whose contributions are greater than or equal to a predetermined threshold among the multiple images in the target image group may be aggregated based on contributions of the one or more images, to obtain an aggregated feature as the feature of the target image group. For example, in the feature aggregation step S508, a weighted average of the features of the one or more images whose contributions are greater than or equal to the predetermined threshold among the multiple images in the target image group may be calculated based on the contributions of the one or more images, as the feature of the target image group.

As described above, similar to the device 100 for classification using a pre-trained classification model according to the embodiment of the present disclosure, with the method 500 for classification using a pre-trained classification model according to the embodiment of the present disclosure, contributions of the images included in the target image group are calculated, and the features of the images included in the target image group are aggregated based on the calculated contributions, thereby the target image group is classified based on an aggregated feature. Compared with the conventional technology in which the target image group is classified based on an average of features of the images included in the target image group, with the method 500 according to the embodiment of the present disclosure, the target image group is classified based on features of one or more images in the target image group with consideration of the contribution of each image in the target image group to the classification result, and thus classification accuracy can be improved.

According to an embodiment of the present disclosure, for each of the multiple images included in the target image group, a contribution of the image to the classification result of the target image group may be represented by a scalar. For example, a contribution of each image may be represented by a number greater than zero.

According to an embodiment of the present disclosure, for each of the multiple images included in the target image group, a contribution of the image to the classification result of the target image group includes a contribution of a feature of the image in each dimension to the classification result of the target image group. For example, in a case that an image includes a feature in N dimensions (for example, 512 dimensions), a contribution of the image may be represented by an N-dimensional contribution vector. Elements in the N-dimensional contribution vector respectively represent contributions of the N dimensions of the feature of the image to the classification result. For example, through calculating a contribution for each dimension of the feature of the image, the classification accuracy can be further improved.

According to an embodiment of the present disclosure, the pre-trained classification model may be obtained from an initial classification model by: extracting, for each sample image in at least one sample image group included in a training sample set, a feature of the sample image using a feature extraction layer of the initial classification model; for each of the at least one sample image group: calculating, for each sample image in the sample image group, a contribution of the sample image to a classification result of the sample image group using a contribution calculation layer of the initial classification model, and aggregating features of sample images in the sample image group based on contributions of the sample images in the sample image group, to obtain an aggregated feature as a feature of the sample image group; and training, using the feature of each of the at least one sample image group, the initial classification model based on a loss function for the initial classification model to meet a predetermined convergence condition.

For example, the predetermined convergence condition may be one of: the number of training reaches a predetermined number; the loss function is minimized; and the loss function is less than or equal to a predetermined threshold.

According to an embodiment of the present disclosure, the loss function may include a classification loss function and a contribution loss function. The contribution loss function may be used for characterizing a distance between a feature of each of the at least one sample image group and a center of a feature of a class into which the sample image group is classified. For example, the loss function L may be expressed as the above equation (3).

In the conventional technology, in a process of training a classification model, in view of problems such as processing capacity of a training device, training is usually performed by a mini-batch, and thus global information is ignored. By introducing the contribution loss function in training as described above, the classification model is trained taking into account of global information obtained from the training sample set or a training sample subset, which improves accuracy of the trained classification model obtained thereby, for example.

Figure 6:
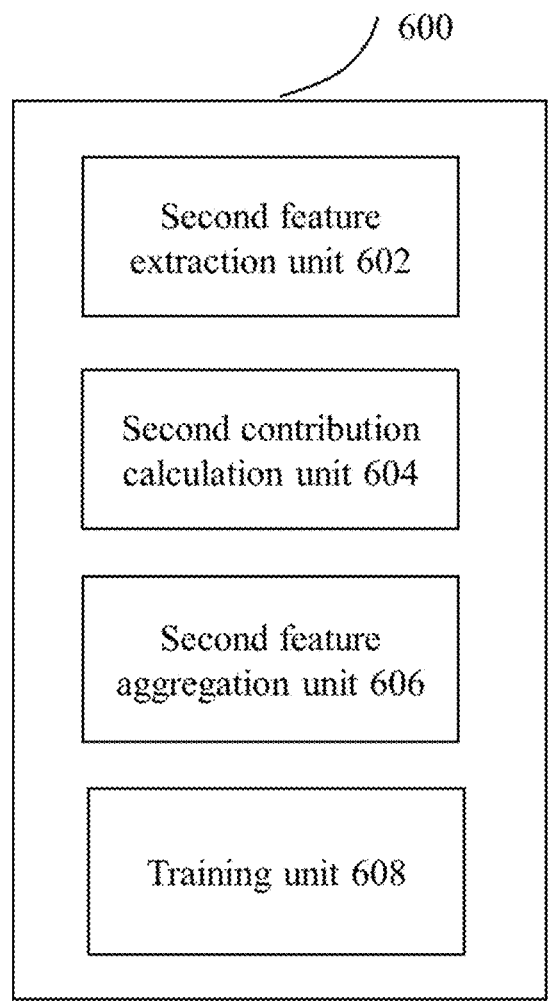
FIG. 6 is a block diagram of a functional configuration example of a device for training an initial classification model according to an embodiment of the present disclosure.

Examples of the device 100 and the method 500 for classification using a pre-trained classification model according to the embodiments of the present disclosure have been described above. According to the present disclosure, a device for training an initial classification model is further provided. FIG. 6 is a block diagram showing a functional configuration example of a device 600 for training an initial classification model according to an embodiment of the present disclosure.

As shown in FIG. 6, the device 600 for training an initial classification model according to an embodiment of the present disclosure includes a second feature extraction unit 602, a second contribution calculation unit 604, a second feature aggregation unit 606 and a training unit 608.

The second feature extraction unit 602 may be configured to extract, for each sample image in at least one sample image group included in a training sample set, a feature of the sample image using a feature extraction layer of the initial classification model.

The second contribution calculation unit 604 may be configured to calculate, for each of the at least one sample image group, contributions of respective sample images in the sample image group to a classification result of the sample image group using a contribution calculation layer of the initial classification model.

The second feature aggregation unit 606 may be configured to aggregate, for each of the at least one sample image group, features of sample images in the sample image group extracted by the second feature extraction unit 602 based on contributions of the sample images in the sample image group calculated by the second contribution calculation unit 604, to obtain an aggregated feature as a feature of the sample image group.

The training unit 608 may be configured to train, using the feature of each of the at least one sample image group, the initial classification model based on a loss function for the initial classification model to meet a predetermined convergence condition, to obtain the pre-trained classification model.

Details of training the initial classification model by the device 600 according to the embodiment of the present disclosure may be similar to those of the above description for the device 100 and the method 500 for classification using a pre-trained classification model according to the embodiments of the present disclosure, and thus the details are not repeated herein.

The device 600 for training an initial classification model according to the embodiment of the present disclosure has strong versatility and can be easily applied to any suitable initial classification model. In addition, the device 600 for training an initial classification model according to the embodiment of the present disclosure may train the initial classification model based on one or more images in a sample image group with consideration of a contribution of each sample image in the sample image group, and thus an classification accuracy of the pre-trained classification model obtained thereby can be improved.

It should be noted that though functional configurations of the device and the method for classification using a pre-trained classification model and the device for training an initial classification model according to the embodiments of the present disclosure have been described above, the above descriptions are merely illustrative rather than restrictive. Those skilled in the art may modify the above embodiments based on principles of the present disclosure. For example, those skilled in the art may add, delete or combine functional modules and operations in the above embodiments. Such modifications fall within the scope of the present disclosure.

It should further be noted that the method embodiments herein correspond to the above device embodiments. Therefore, details not described in the method embodiments may refer to corresponding parts in the device embodiments, and are not repeated here.

In addition, a storage medium and a program product are further provided according to the present disclosure. It should be understood that machine executable instructions in the storage medium and the program product according to embodiments of the present disclosure may further be configured to perform the above method for classification using a pre-trained classification model. Therefore, details not described here may refer to corresponding parts in the above, and are not repeated here.

Accordingly, a storage medium for carrying the program product including machine executable instructions is also included in the present disclosure. The storage medium includes but is not limited to a floppy disk, an optical disk, a magneto-optical disk, a memory card, a memory stick and the like.

In addition, it should further be pointed out that the above series of processing and devices may also be implemented by software and/or firmware. In a case that the above series of processing and apparatuses are implemented by software and/or firmware, a program constituting the software is installed from a storage medium or network to a computer with a dedicated hardware structure, for example, a general-purpose personal computer 700 shown in FIG. 7. The computer can perform various functions when being installed with various programs.

Figure 7:
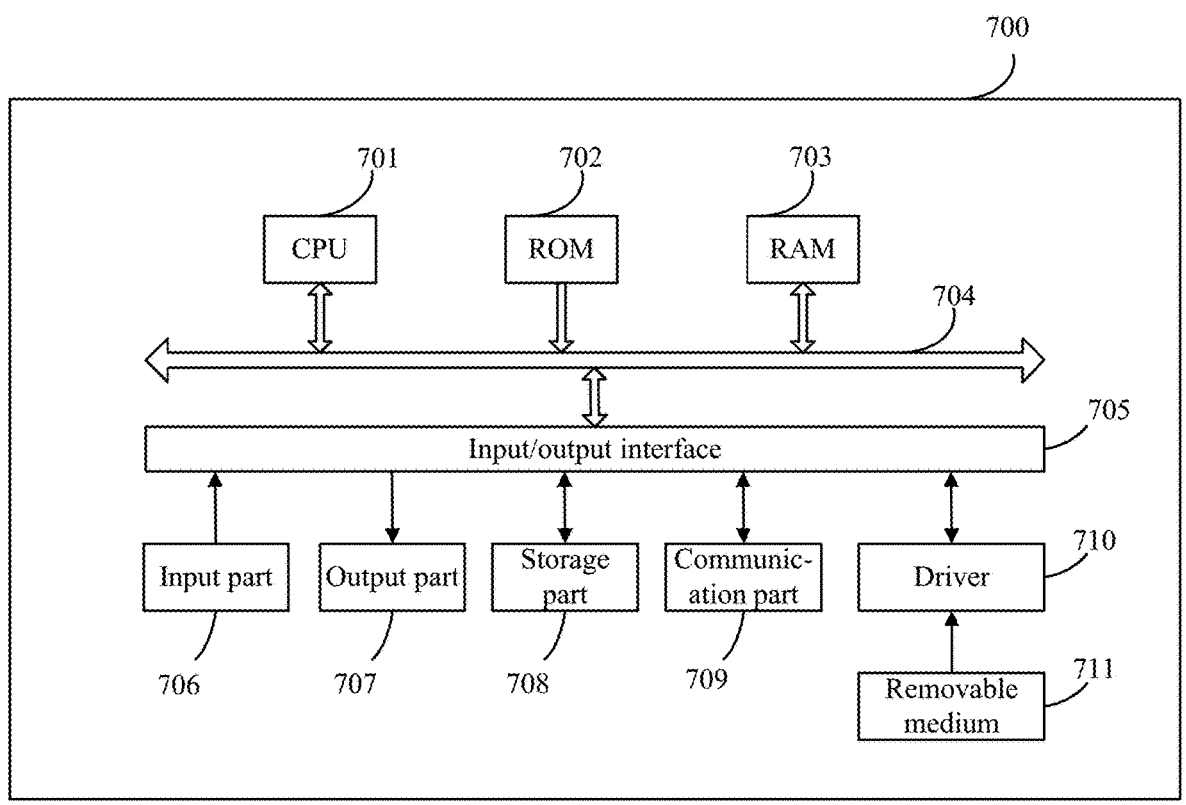
FIG. 7 is a block diagram of an exemplary structure of a personal computer that may be used in embodiments of the present disclosure.

In FIG. 7, a central processing unit (CPU) 701 executes various processing according to a program stored in a read-only memory (ROM) 702 or a program loaded from a storage part 708 to a random access memory (RAM) 703. Data required when the CPU 701 performs various processing is also stored in the RAM 703 as needed The CPU 701, the ROM 702 and the RAM 703 are connected each other via a bus 704. An input/output interface 705 is also connected to the bus 704.

The following parts are connected to the input/output interface 705: an input part 706 including a keyboard, a mouse and the like; an output part 707 including a display such as a cathode ray tube (CRT) and a liquid crystal display (LCD), a loudspeaker and the like; a storage part 708 including a hard disk and the like; and a communication part 709 including a network interface card such as a local area network (LAN) card, a modem and the like. The communication part 709 performs communication processing via a network such as the Internet.

A driver 710 may also be connected to the input/output interface 705 as needed. A removable medium 711 such as a magnetic disk, an optical disk, a magneto-optical disk, and a semiconductor memory is mounted on the driver 710 as needed, so that a computer program read from the removable medium 711 is installed in the storage part 708 as needed.

In a case that the above series of processing is implemented by software, the program constituting the software is installed from the network such as the Internet or the storage medium such as the removable medium 711.

Those skilled in the art should understand that the storage medium is not limited to the removable medium 711 shown in FIG. 7 that has the program stored therein and is distributed separately from the apparatus so as to provide the program to the user. Examples of the removable medium 711 include a magnetic disk (including a floppy disk (registered trademark)), an optical disk (including a compact disk read only memory (CD-ROM) and a digital versatile disc (DVD)), a magneto-optical disk (including a MiniDisc (MD) (registered trademark)), and a semiconductor memory. Alternatively, the storage medium may be the ROM 702, a hard disk included in the storage part 708 or the like. The storage medium has a program stored therein and is distributed to the user together with a device in which the storage medium is included.

Preferred embodiments of the present disclosure have been described above with reference to the drawings. However, the present disclosure is not limited to the above embodiments. Those skilled in the art may obtain various modifications and changes within the scope of the appended claims. It should be understood that these modifications and changes naturally fall within the technical scope of the present disclosure.

For example, multiple functions implemented by one unit in the above embodiments may be implemented by separate devices. Alternatively, multiple functions implemented by multiple units in the above embodiments may be implemented by separate devices, respectively. In addition, one of the above functions may be implemented by multiple units. Of course, such configuration is included in the technical scope of the present disclosure.

In this specification, the steps described in the flowchart include not only processing performed in time series in the described order, but also processing performed in parallel or individually rather than necessarily in time series. Furthermore, the steps performed in time series may be performed in another order appropriately.

In addition, the technology according to the present disclosure may also be configured as follows.

Solution 1. A device for classification using a pre-trained classification model, including:

a feature extraction unit configured to extract, for each of multiple images in a target image group to be classified, a feature of the image using a feature extraction layer of the pre-trained classification model;

a contribution calculation unit configured to calculate, for each of the multiple images, a contribution of the image to a classification result of the target image group using a contribution calculation layer of the pre-trained classification model;

a feature aggregation unit configured to aggregate features of the multiple images extracted by the feature extraction unit based on contributions of the multiple images calculated by the contribution calculation unit, to obtain an aggregated feature as a feature of the target image group; and a classification unit configured to classify the target image group based on the feature of the target image group.

Solution 2. The device according to Solution 1, where the feature aggregation unit is further configured to calculate a weighted average of the features of the multiple images extracted by the feature extraction unit based on the contributions of the multiple images calculated by the contribution calculation unit, as the feature of the target image group.

Solution 3. The device according to Solution 1, where the feature aggregation unit is further configured to aggregate, based on contributions of one or more images whose contributions are greater than or equal to a predetermined threshold among the multiple images, features of the one or more images, to obtain an aggregated feature as the feature of the target image group.

Solution 4. The device according to any one of Solutions 1 to 3, where for each of the multiple images, a contribution of the image to the classification result of the target image group is represented by a scalar.

Solution 5. The device according to any one of Solutions 1 to 3, where for each of the multiple images, a contribution of the image to the classification result of the target image group includes a contribution of a feature of the image in each dimension to the classification result of the target image group.

Solution 6. The device according to any one of Solutions 1 to 3, where the pre-trained classification model is obtained from an initial classification model by:

extracting, for each sample image in at least one sample image group included in a training sample set, a feature of the sample image using a feature extraction layer of the initial classification model;

for each of the at least one sample image group:
calculating, for each sample image in the sample image group, a contribution of the sample image to a classification result of the sample image group using a contribution calculation layer of the initial classification model, and
aggregating features of sample images in the sample image group based on contributions of the sample images in the sample image group, to obtain an aggregated feature as a feature of the sample image group; and training, using the feature of each of the at least one sample image group, the initial classification model based on a loss function for the initial classification model to meet a predetermined convergence condition.

Solution 7. The device according to Solution 6, where the loss function includes:
a classification loss function for characterizing a classification loss of the initial classification model; and
a contribution loss function for characterizing a distance between a feature of each of the at least one sample image group and a center of a feature of a class into which the sample image group is classified.

Solution 8. The device according to Solution 6, where a parameter of the feature extraction layer of the initial classification model is fixed when training the initial classification model.

Solution 9. A method for classification using a pre-trained classification model, including:
a feature extraction step including extracting, for each of multiple images in a target image group to be classified, a feature of the image using a feature extraction layer of the pre-trained classification model;
a contribution calculation step including calculating, for each of the multiple images, a contribution of the image to a classification result of the target image group using a contribution calculation layer of the pre-trained classification model;
a feature aggregation step including aggregating features of the multiple images extracted in the feature extraction step based on contributions of the multiple images calculated in the contribution calculation step, to obtain an aggregated feature as a feature of the target image group; and
a classification step including classifying the target image group based on the feature of the target image group.

Solution 10. The method according to Solution 9, where in the feature aggregation step, a weighted average of the features of the multiple images extracted in the feature extraction step is calculated based on the contributions of the multiple images calculated in the contribution calculation step, as the feature of the target image group.

Solution 11. The method according to Solution 9, where in the feature aggregation step, features of one or more images whose contributions are greater than or equal to a predetermined threshold among the multiple images are aggregated based on contributions of the one or more images, to obtain an aggregated feature as the feature of the target image group.

Solution 12. The method according to any one of Solutions 9 to 11, where for each of the multiple images, a contribution of the image to the classification result of the target image group is represented by a scalar.

Solution 13. The method according to any one of Solutions 9 to 11, where for each of the multiple images, a contribution of the image to the classification result of the target image group includes a contribution of a feature of the image in each dimension to the classification result of the target image group.

Solution 14. The method according to any one of Solutions 9 to 11, where the pre-trained classification model is obtained from an initial classification model by:
extracting, for each sample image in at least one sample image group included in a training sample set, a feature of the sample image using a feature extraction layer of the initial classification model;

for each of the at least one sample image group:
calculating, for each sample image in the sample image group, a contribution of the sample image to a classification result of the sample image group using a contribution calculation layer of the initial classification model, and
aggregating features of sample images in the sample image group based on contributions of the sample images in the sample image group, to obtain an aggregated feature as a feature of the sample image group; and training, using the feature of each of the at least one sample image group, the initial classification model based on a loss function for the initial classification model to meet a predetermined convergence condition.

Solution 15. The method according to Solution 14, where the loss function includes:
a classification loss function for characterizing a classification loss of the initial classification model; and
a contribution loss function for characterizing a distance between a feature of each of the at least one sample image group and a center of a feature of a class into which the sample image group is classified.

Solution 16. The method according to Solution 14, where a parameter of the feature extraction layer of the initial classification model is fixed when training the initial classification model.

Solution 17. A computer readable storage medium having program instructions stored therein, the program instructions, when executed by a computer, implementing the method according to any one of Solutions 9 to 16.

The invention claimed is:

1. A device for classification using a pre-trained classification model, comprising:
a feature extraction unit configured to extract, for each of a plurality of images in a target image group to be classified, a feature of the image using a feature extraction layer of the pre-trained classification model;
a contribution calculation unit configured to calculate, for each of the plurality of images, a contribution of the image to a classification result of the target image group using a contribution calculation layer of the pre-trained classification model;
a feature aggregation unit configured to aggregate features of the plurality of images extracted by the feature extraction unit based on contributions of the plurality of images calculated by the contribution calculation unit, to obtain an aggregated feature as a feature of the target image group; and
a classification unit configured to classify the target image group based on the feature of the target image group.

2. The device according to claim 1, wherein the feature aggregation unit is further configured to calculate a weighted average of the features of the plurality of images extracted by the feature extraction unit based on the contributions of the plurality of images calculated by the contribution calculation unit, as the feature of the target image group.

3. The device according to claim 1, wherein the feature aggregation unit is further configured to aggregate, based on contributions of one or more images whose contributions are greater than or equal to a predetermined threshold among the plurality of images, features of the one or more images, to obtain an aggregated feature as the feature of the target image group.

4. The device according to claim 1, wherein for each of the plurality of images, a contribution of the image to the classification result of the target image group is represented by a scalar.

5. The device according to claim 1, wherein for each of the plurality of images, a contribution of the image to the classification result of the target image group comprises a contribution of a feature of the image in each dimension to the classification result of the target image group.

6. The device according to claim 1, wherein the pre-trained classification model is obtained from an initial classification model by:
- extracting, for each sample image in at least one sample image group comprised in a training sample set, a feature of the sample image using a feature extraction layer of the initial classification model;
- for each of the at least one sample image group:
  - calculating, for each sample image in the sample image group, a contribution of the sample image to a classification result of the sample image group using a contribution calculation layer of the initial classification model, and
  - aggregating features of sample images in the sample image group based on contributions of the sample images in the sample image group, to obtain an aggregated feature as a feature of the sample image group; and
- training, using the feature of each of the at least one sample image group, the initial classification model based on a loss function for the initial classification model to meet a predetermined convergence condition.

7. The device according to claim 6, wherein the loss function comprises:
- a classification loss function for characterizing a classification loss of the initial classification model; and
- a contribution loss function for characterizing a distance between a feature of each of the at least one sample image group and a center of a feature of a class into which the sample image group is classified.

8. The device according to claim 6, wherein a parameter of the feature extraction layer of the initial classification model is fixed when training the initial classification model.

9. A method for classification using a pre-trained classification model, comprising:
- extracting, for each of a plurality of images in a target image group to be classified, a feature of the image using a feature extraction layer of the pre-trained classification model;
- calculating, for each of the plurality of images, a contribution of the image to a classification result of the target image group using a contribution calculation layer of the pre-trained classification model;
- aggregating extracted features of the plurality of images based on calculated contributions of the plurality of images, to obtain an aggregated feature as a feature of the target image group; and
- classifying the target image group based on the feature of the target image group.

10. The method according to claim 9, wherein the aggregating comprises calculating a weighted average of the extracted features of the plurality of images, based on the calculated contributions of the plurality of images, as the feature of the target image group.

11. The method according to claim 9, wherein the aggregating comprises aggregating features of one or more images whose contributions are greater than or equal to a predetermined threshold among the plurality of images, based on contributions of the one or more images, to obtain an aggregated feature as the feature of the target image group.

12. The method according to claim 9, wherein for each of the plurality of images, a contribution of the image to the classification result of the target image group is represented by a scalar.

13. The method according to claim 9, wherein for each of the plurality of images, a contribution of the image to the classification result of the target image group comprises a contribution of a feature of the image in each dimension to the classification result of the target image group.

14. The method according to claim 9, wherein the pre-trained classification model is obtained from an initial classification model by:
- extracting, for each sample image in at least one sample image group comprised in a training sample set, a feature of the sample image using a feature extraction layer of the initial classification model;
- for each of the at least one sample image group:
  - calculating, for each sample image in the sample image group, a contribution of the sample image to a classification result of the sample image group using a contribution calculation layer of the initial classification model, and
  - aggregating features of sample images in the sample image group based on contributions of the sample images in the sample image group, to obtain an aggregated feature as a feature of the sample image group; and
- training, using the feature of each of the at least one sample image group, the initial classification model based on a loss function for the initial classification model to meet a predetermined convergence condition.

15. The method according to claim 14, wherein the loss function comprises:
- a classification loss function for characterizing a classification loss of the initial classification model; and
- a contribution loss function for characterizing a distance between a feature of each of the at least one sample image group and a center of a feature of a class into which the sample image group is classified.

16. The method according to claim 14, wherein a parameter of the feature extraction layer of the initial classification model is fixed when training the initial classification model.

17. A non-transitory computer readable storage medium having program instructions stored therein, the program instructions, when executed by a computer, implementing the method according to claim 9.

* * * * *